United States Patent [19]

Deans et al.

[11] 3,998,037
[45] Dec. 21, 1976

[54] MEANS FOR MULCHING LEAVES AND THE LIKE

[76] Inventors: John N. Deans, 67 E. Central Ave.; Eugene B. Woodhull, 61 E. Central Ave., both of Wharton, N.J. 07885

[22] Filed: Dec. 18, 1975

[21] Appl. No.: 642,139

[52] U.S. Cl. .................................................. 56/295
[51] Int. Cl.² ........................................ A01D 55/18
[58] Field of Search ............ 56/295, 503, 255, 17.5

[56] References Cited

UNITED STATES PATENTS

| | | | |
|---|---|---|---|
| 3,022,621 | 2/1962 | Zavarella | 56/295 |
| 3,104,510 | 9/1963 | Voigt | 56/295 |
| 3,482,380 | 12/1969 | Stair | 56/295 |
| 3,538,692 | 11/1970 | Cope et al. | 56/295 |
| 3,780,509 | 12/1973 | Woelffer | 56/295 |

*Primary Examiner*—J.N. Eskovitz
*Attorney, Agent, or Firm*—Joseph T. Skelley

[57] ABSTRACT

In one embodiment thereof, the means comprises an elongate blade-like element which is centrally bored for drive coupling thereof to the power shaft of a lawn mower. The element has leading and trailing edges, the former being sharp for cutting purposes. Also, the leading and trailing edges are discontinuous; cut-outs are formed in the leading edge, and teeth have been turned up therefrom, and slots are formed in the trailing edge, and burrs have been turned up therefrom. The teeth, as well as radial ends of the elongate element, have cutting edges formed thereon. Additionally, radial ends of the element, at the trailing edges thereof, also have been bent upwards to define triangular control tips thereat.

15 Claims, 6 Drawing Figures

U.S. Patent     Dec. 21, 1976     3,998,037
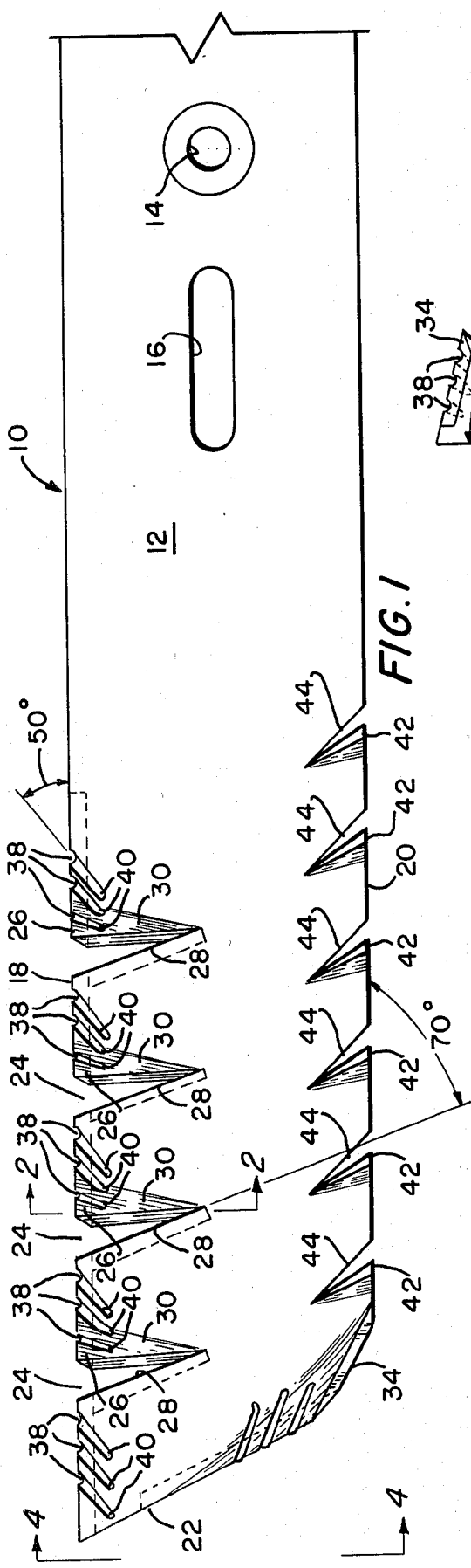
FIG. 1
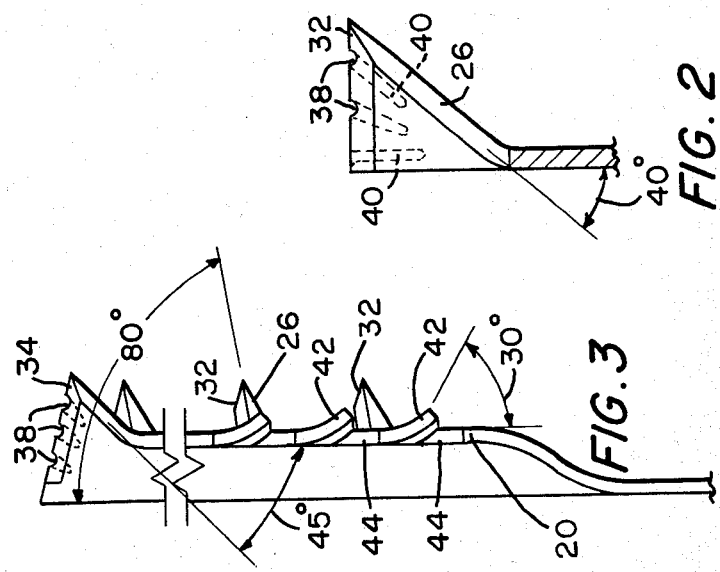
FIG. 2
FIG. 3
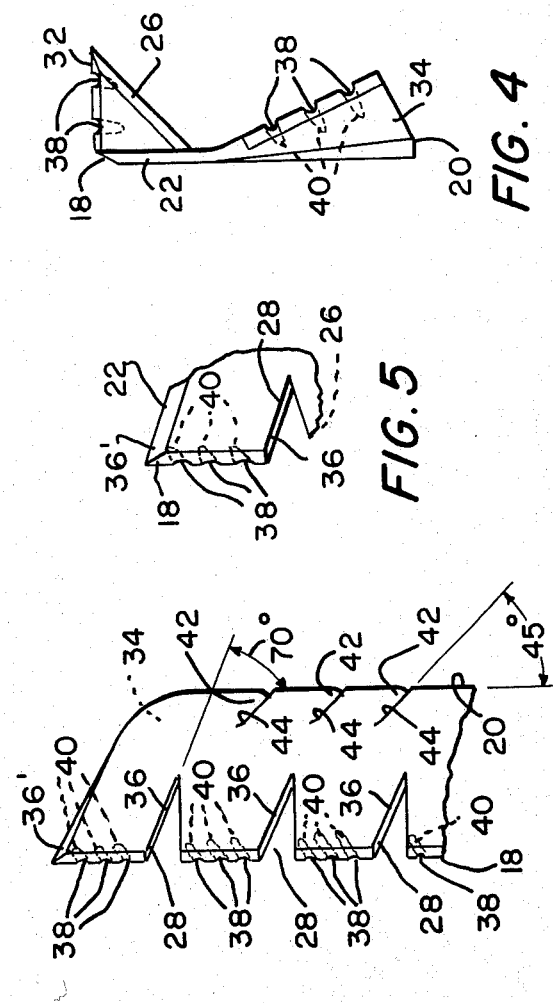
FIG. 4
FIG. 5
FIG. 6

MEANS FOR MULCHING LEAVES AND THE LIKE

This invention pertains to lawn mower blades and the like, and in particular to such blades capable of mulching leaves.

In the prior art, leaf-mulcher devices are generally of two types: those which attempt to loft the leaves and then mulch them — and may have mulching cutters, or whatever, replaceably fixed to a standard lawn mower machine, and those which endeavor to mulch the leaves on the ground. The latter type, typically, have depending spikes or rods. Usually, the first-identified prior art type is expensive, and burdensome to assemble. As for the latter type, they are not unduly expensive, however they require that the standard blade be bored to receive attaching hardware, and ultimately, the adapted blade must be properly balanced — for the safety of the operator, and to prevent undue strain on the power unit. Too, they can be most dangerous, besides having a high mortality. Debris presents both a risk to the operator, and frequent destruction of the spikes, rods, or whatever (on sticks, rocks, and like debris).

The problem of dismembering or mulching leaves concerns itself with two basic aspects. The first of these is air movement, and the other is leaf control. It is an object of this invention to set forth an improved mulching means which is usable in a standard lawn mower and which benefits from a design drawn from the aforementioned aspects.

Particularly, it is an object of this invention to set forth means for mulching leaves and the like, comprising an elongate element having a substantially flat surface, and means for coupling thereof, in an attitude normal to said surface, to a rotary prime mover for effecting powered rotation of said element; said element further having leading and trailing edges, relative to its rotary direction, defining thereof lateral terminations of said surface; said leading edge being discontinuous, having portions thereof relieved by cut-outs; said cut-outs being bounded on one side, at least, by teeth; and wherein said teeth have arcuate bases integral with said element, and terminal tips, integral with said bases, said tips being disposed substantially normal to said surface.

Further objects of this invention, as well as the novel features thereof, will become more apparent by reference to the following description, taken in conjunction with the accompanying figures, in which:

FIG. 1 is a plan view of a fragment of a leaf-mulching blade which comprises an embodiment of the invention;

FIG. 2 is a cross-section taken along 2—2 of FIG. 1;

FIG. 3 is a discontinuous view, in elevation, of the trailing edge (and radial end) of one half of the blade of FIG. 1;

FIG. 4 is a view, in elevation, of the radial end of the blade of FIG. 1 taken along 4—4 of FIG. 1;

FIG. 5 is a minor fragment of the radial end/leading edge portion of the blade of FIG. 1, the same being inverted from the FIG. 1 view; and FIG. 6, too, is a view of the blade of FIG. 1, shown only in fragmented depiction, and inverted from FIG. 1, showing the underlying portion of the radially outward end of the blade.

As shown in the figures, the novel leaf-mulching means 10 comprises an elongate element 12 having a central bore 14 and a pair of elongate apertures 16 by means of which the element 12 is attachable to a rotary prime mover (not shown) by means well known in the art, for effecting powered rotation of the element — in clockwise rotation, as indicated by the arrows (in FIG. 1).

Element 12 has a pair of leading edges 18 and trailing edges 20 (only one of each being shown fully) which join in terminal or radial ends 22. The leading and trailing edges, 18 and 20, are mirror images of each other; that is, in the plan view, edge 18 (which is depicted) is a mirror image of an edge 18 (which is not shown), and edge 20 (which is illustrated) is also a mirror image of its companion edge 20 (which is not illustrated). Accordingly, it is believed sufficient to depict and describe but one radial half of the element 12.

The leading edge 18 is discontinuous. A plurality of cut-outs 24 are formed therein and, from these cut-outs, portions of the leading edge have been bent upwardly to form teeth 26. With particular reference to FIGS. 2–4, it can be seen that the teeth 26 are of generally triangular configuration. They have a slope of approximately 40° (from the tip thereof to the uppermost surface of element 12), while they rise at some 80° — or substantially perpendicularly — from that surface. Each is formed from a linear incision, drawn along a surface 28 defined by the cut-out(s). Surface 28 lies at approximately 70° from the trailing (or leading) edge of element 12. Thus, the teeth 26 bent upwards from incision surfaces 28 have arcuate bases 30. The teeth 26, then, are defined and formed to attack and dismember or mulch leaves which are lofted upward from the ground for centrifugal movement thereof and radial of the element 12.

As for lofting leaves from the ground, the novel element 12 has means formed thereon to create both an optimum, centrifugal swirl, as well as a light vacuum — this to control the movement of the leaves in gyration and to insure the elevation of the leaves to leading edges 32 of the teeth. The radial end(s) 22 of the element 12 has the trailing portion thereof turned upward, at approximately 45°, from the plane of the uppermost surface of the element 12 to define thereof a control tip 34. Tip 34 is both a tooth, which contributes to the mulching of the leaves, and an air controller which enhances the swirl and, therebelow, creates a leaf-lofting light vacuum.

Tip(s) 34, then, will deflect air and leaves inwardly; too, it creates an annular vacuum around the periphery of the element 12 — which tends to insure that leaves will not escape radially, in whole pieces, and be expelled from around the housing of the using lawn mower. Most of the leaves, therefore, are forced to rise to the upper surface of the element 12.

In normal operation, the leading edge 18 will cut most leaves once. Then, under the influence of the control tips 34 they will rise to the uppermost surface of the element 12. Now they will follow the swirl pattern and proceed to move centrifugally and radially of the element 12. In so doing, they become impaled on the teeth 26 where they are torn; i.e., the priorly cut segments are each further torn and dismembered. Few of the now torn segments will escape from the element 12, through a chute of the using mower, before being pierced and torn again by one or another of the more radially-outward teeth 26. This is clear, as the segments and fragments endeavor, continuously, to move outwardly. Finally, control tips 34 last shear the greatly reduced fragments — following which the latter leave the element to be evacuated from the machine/mower.

To further enhance the dismembering of the leaves, surfaces 28 have cutting edges 36 formed thereon as well as radial ends 22. Edges 36 of surfaces 28, and cutting edges 36' of ends 22, are formed on the underlying surface of element 12. So also, the leading edge 18 of the element 12, and the radial ends 22 have serrations 38 formed therein. The serrations 38 in ends 22 are carried in the control tips 34. Each serration comprises the end termination of a ground trough 40 formed in the uppermost surface of the element 12. The troughs 40, as shown in FIG. 1, for instance, are ground in along median lines which lie at some 50° from the leading edge 18 of element 12.

Additionally, to multiply the number of times that leaf fragments are snared and torn, the trailing edge 20, also, has burrs 42 formed in and raised therefrom. Generally on a line of inclination, of approximately 45° from the trailing edge 20, slots 44 are formed. The material adjacent thereto, and outward therefrom, is turned up — to an angle of approximately 30° from the plane of the uppermost surface of the element 12 — to define the burrs 42. Burrs 42 snag fragments of leaves which tear free from the teeth 26 to further dismember the same and reduce the size thereof.

The advantages of our novel leaf-mulching means 10 will be largely self-evident, but it might be useful to note the prominent ones thereof. The inventive element 12 has no appendages projecting downwardly therefrom. It is inherently balanced, and is simple to manufacture — being of one-piece construction. Too, in view of the removed metal/material, it is lighter in weight than a standard blade of comparable dimensions. The triangular configuration of the teeth 26 and burrs 42 — as well as control tips 34 — afford high durability and strength. Over extended test and experimentation with the means 10, as embodied in element 12, it has been found that a lawn is so thoroughly cleared — with an accompanying bagging of the formed mulch — that raking is wholly unnecessary. Too, it has proved out that the mulch created is so fine, that there is virtually no clogging of the collector bag.

Now, while we have described our invention in connection with a specific embodiment thereof, it is to be clearly understood that this is done only by way of example and not as a limitation to the scope of our invention as set forth in the objects thereof and in the appended claims.

We claim:
1. Means for mulching leaves and the like, comprising:
    an elongate element having a substantially flat surface, and shaft-receiving means for coupling thereof, in an attitude normal to said surface, to a power shaft of a rotary prime mover for effecting powered rotation of said element;
    said element further having leading and trailing edges, relative to its rotary direction, defining thereof lateral terminations of said surface;
    said leading edge being discontinuous, having portions thereof relieved by cut-outs;
    said cut-outs being bounded on one side, at least, by teeth; wherein
    said teeth have arcuate bases integral with said element, and terminal tips, integral with said bases, said tips being disposed substantially normal to said surface; and wherein
    said cut-outs, in plan, are generally of triangular configuration in which the bases of said cut-outs are formed in said leading edge.
2. Means, according to claim 1, wherein:
    said element has an outer radial end, relative to said coupling means, said radial end being joined by said leading and trailing edges; and
    a trailing portion of said radial end which is joined to said trailing edge, and a radial end portion of said trailing edge, are arcuately bent away from a plane defined by said flat surface to define a control tip.
3. Means, according to claim 2, wherein:
    said control tip, in side elevation, has a generally triangular configuration in which the base of said configuration extends from said trailing edge to an intermediate location between said leading and trailing edges, and the apex of said configuration is adjacent to said traling edge.
4. Means, according to claim 2, wherein:
    said control tip is bent from said plane to an angle of from 45° to 90° of arc.
5. Means, according to claim 1, wherein:
    said element has an upper surface and an underlying surface; and
    said teeth are raised in elevation above said upper surface.
6. Means, according to claim 5, wherein:
    said teeth extend from said leading edge, having leading ends which are contiguous with said leading edge of said element, and extend rearward from said leading edge of said element toward said trailing edge of said element.
7. Means, according to claim 6, wherein:
    said teeth have cutting edges formed on said leading ends thereof.
8. Means, according to claim 7, wherein:
    said cutting edges of said teeth are formed on radially outermost surfaces of said teeth.
9. Means, according to claim 6, wherein:
    said element has a cutting edge formed on said underlying surface and leading edge thereof, whereat said underlying surface and leading edge join.
10. Means, according to claim 6, wherein:
    said element has an outer radial end, relative to said coupling means, joined by said leading and trailing edges; and
    said underlying surface of said radial end has a cutting edge formed thereon.
11. Means, according to claim 10, wherein:
    said cut-outs each have a linear surface which lies along an arc of approximately 70° from said leading and trailing edges.
12. Means, according to claim 10, wherein:
    said leading edge of said element has a plurality of spaced-apart serrations formed therein, each of said serrations further having ground troughs extending therefrom rearward toward said trailing edge, a median line drawn through each serration and its associated trough lying at approximately 50° of arc from said leading edge.
13. Means, according to claim 12, wherein:
    said troughs are formed in said upper surface of said element.
14. Means, according to claim 13, wherein:
    said trailing edge of said element is discontinuous, having portions thereof relieved by slots;
    said slots being bounded on one side, at least, by burrs; and wherein said burrs have arcuate bases integral with said element, and terminal tips, integral with said bases, said tips of said burrs being disposed in planes lying diagonal to said flat surface of said element.

15. Means, according to claim 14, wherein:

said slots each have a linear surface which lies along an arc of approximately 45° from said leading and trailing edges.

* * * * *